United States Patent [19]

Gustafson

[11] Patent Number: 4,491,347

[45] Date of Patent: Jan. 1, 1985

[54] CRYOGENIC CONNECTOR

[75] Inventor: Keith W. Gustafson, New Prague, Minn.

[73] Assignee: Minnesota Valley Engineering, Inc., New Prague, Minn.

[21] Appl. No.: 336,695

[22] Filed: Jan. 4, 1982

[51] Int. Cl.³ ............................................. F16L 59/14
[52] U.S. Cl. ..................................... 285/47; 285/381; 285/DIG. 5; 285/DIG. 6; 285/353
[58] Field of Search .......... 285/381, DIG. 5, DIG. 6, 285/47, 353

[56] References Cited

U.S. PATENT DOCUMENTS

| | | | |
|---|---|---|---|
| 2,980,448 | 4/1961 | Holben | 285/DIG. 5 X |
| 3,137,143 | 6/1964 | Jacobs et al. | 285/47 X |
| 3,195,564 | 7/1965 | Carney et al. | 285/DIG. 5 X |
| 3,262,719 | 7/1966 | Gemma | 285/381 X |
| 3,507,522 | 4/1970 | Froman et al. | 285/187 |
| 3,893,720 | 7/1975 | Moebius | 285/DIG. 6 X |
| 3,988,029 | 10/1976 | Gibson | 285/DIG. 5 X |
| 4,011,732 | 3/1977 | Doherty et al. | 285/47 X |
| 4,135,743 | 1/1979 | Hughes | 285/381 X |
| 4,198,081 | 4/1980 | Harrison et al. | 285/381 |
| 4,283,079 | 8/1981 | Flaherty | 285/381 |

FOREIGN PATENT DOCUMENTS 511483 12/1953 Belgium .................. 285/DIG. 6

Primary Examiner—Thomas F. Callaghan
Attorney, Agent, or Firm—McDougall, Hersh & Scott

[57] ABSTRACT

A cryogenic connector which embodies interfitting male and female metal members, each having a portion in sliding engagement in the assembled relation with said portion of the female member having a coefficient of expansion greater than the corresponding portion of the male member to provide a mechanical shrink seal therebetween at cryogen temperature.

7 Claims, 4 Drawing Figures

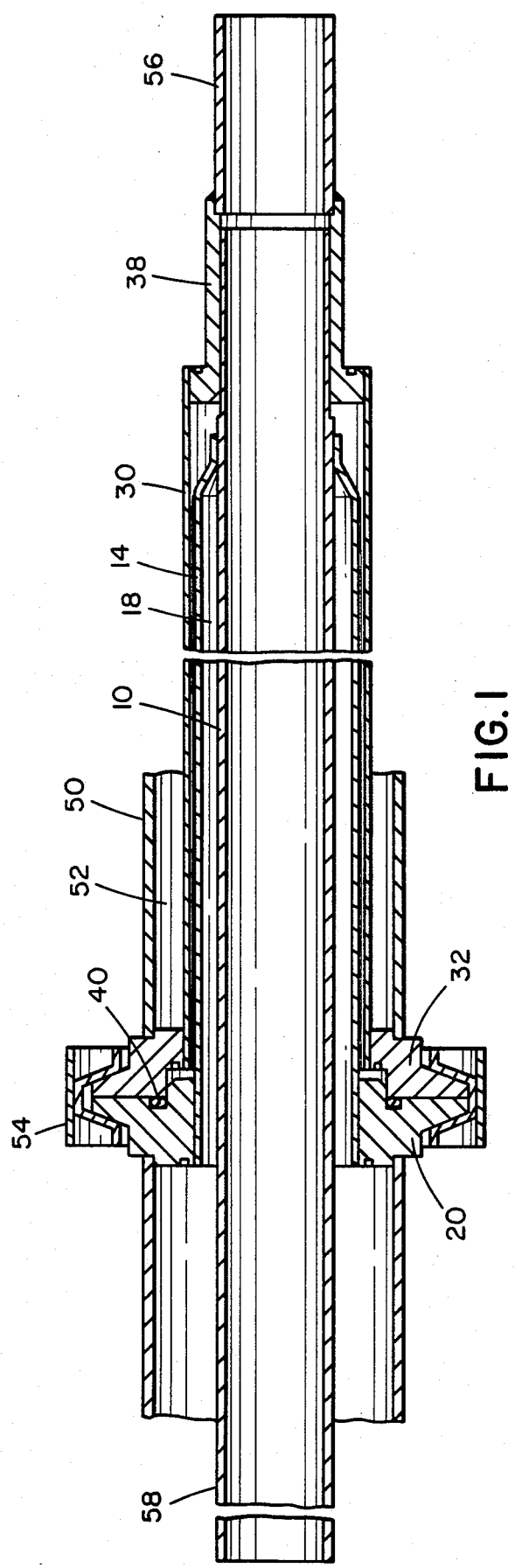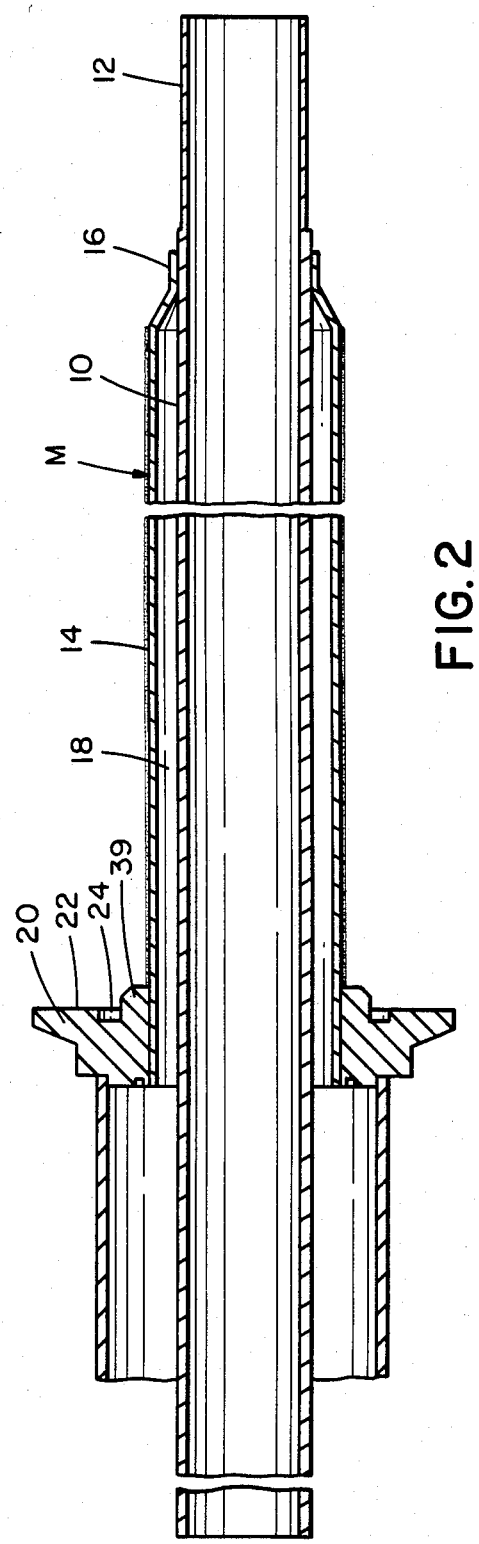

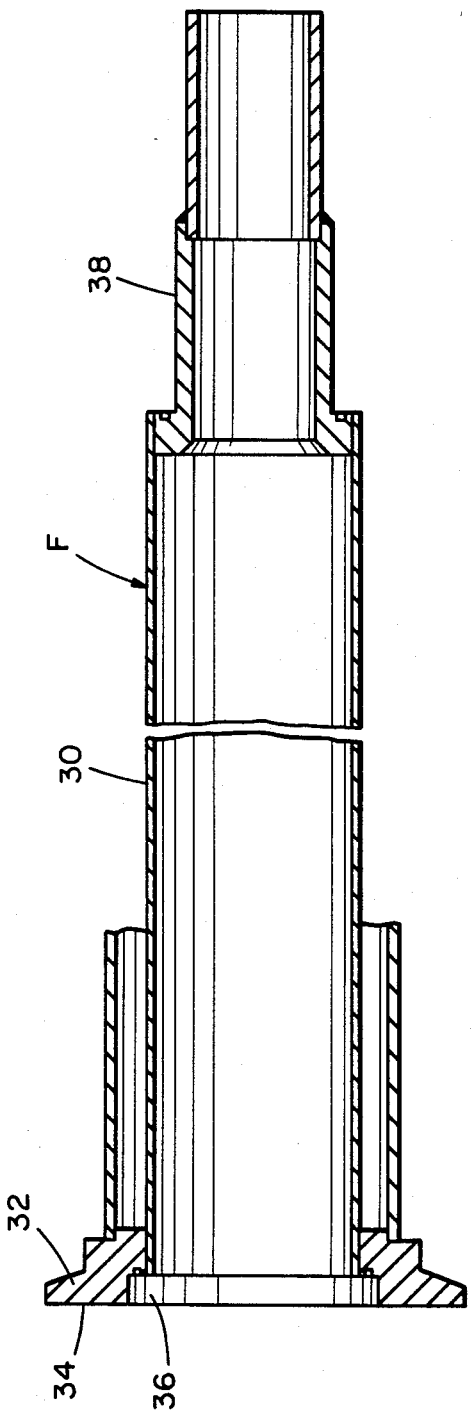
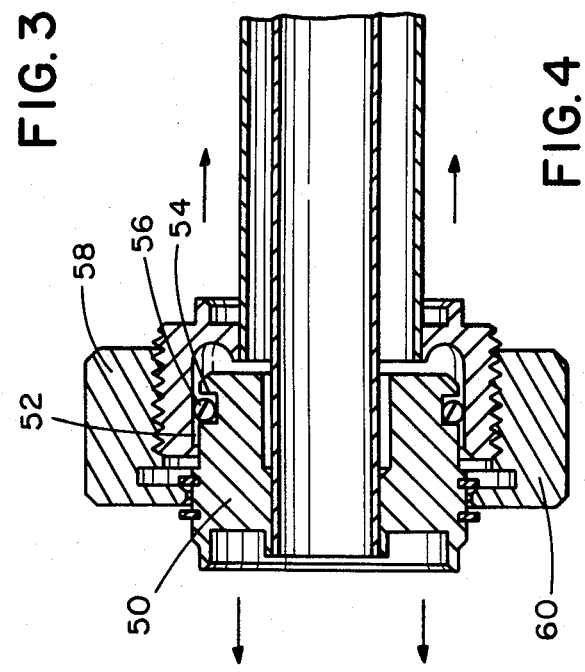

CRYOGENIC CONNECTOR

This invention relates to cryogenic equipment for the handling of cryogenic materials, such as liquefied gases at cryogen temperatures, and it relates more particularly to an insulated means for joining crygenic components in a tight sealing relation for the transmission of cryogenic materials therebetween.

As used herein, the term "cryogenic materials" is meant to refer to flowable fluids at cryogen temperatures, such as liquefied argon, nitrogen, oxygen, air, helium, and the like liquefied gases.

Invention will hereinafter be described with reference to a joint between one conduit and another but it will be understood that the described joint may be between one conduit and a piece of equipment, or between pieces of equipment and the like.

To the present, cryogenic components have been connected with a bayonet type joint formed of a pair of closely fitting concentric tubular members in which an "O" ring therebetween forms the primary seal. The cryogenic fluid flows between the concentric tubular members to a point where it is vaporized by the incoming heat. This provides a vapor trap between the tubular members which is relied upon to keep the fluid in the bayonet, while warm vapor is held at the "O" ring seal.

It is an object of this invention to provide a new and improved bayonet type joint which relies upon the development of a mechanical seal whereby the cryogenic material is kept within the bayonet and which provides for an increased length in the heat conduction path thereby to add up to a more effective and more efficient joint.

These and other objects and advantages of this invention will hereafter appear and, for purposes of illustration, but not of limitation, an embodiment of the invention is shown in the accompanying drawings, in which:

FIG. 1 is a sectional elevational view showing the bayonet of this invention with the parts in their assembled relation;

FIG. 2 is a sectional elevational view of the male member in the bayonet of FIG. 1;

FIG. 3 is a sectional elevational view of the female member of the bayonet shown in FIG. 1; and FIG. 4 is a sectional elevational view of the connection between the bayonet members wherein a radial seal is provided therebetween.

The bayonet joint embodying the features of this invention is formed of a female bayonet F which receives in telescoping relation a male bayonet member M with a face seal between the telescoped members to provide an initial seal therebetween until a mechanical shrink seal is developed between the members in response to the reduction in temperature that occurs as the cryogenic material flows through the joint.

Instead of making use of a face seal between the bayonet members, considerable advantage is derived from the use of a radial seal, hereinafter to be described, allowing adjustment in the assembled length of the bayonet connection, especially during installation.

The male member M comprises an elongate tubular member 10 of substantially uniform internal diameter throughout its length and with a substantially uniform outer wall to wall diameter except for an end portion 12 of reduced wall thickness. A concentric outer casing 14, in the form of a tubular member having a length somewhat less than the length of the inner tubular member 10, and an internal diameter greater than the external diameter of the tubular member 10, is secured at one end 16 to the portion of the tubular member 10 immediately adjacent the end portion 12 of reduced wall thickness to provide an annular space 18 therebetween. The end portion 16 is formed to extend curvilinearly inwardly into engagement with the tubular member 10 for joinder therewith, as by conventional metal joining means, such as brazing or soldering, and preferably welding.

The other end of the outer casing 14 is provided with an outwardly extending annular bayonet flange 20 extending radially outwardly from the end of the casing and having a flat face 22 with an annular recess 24 facing in the forward direction.

The female member F is dimensioned to enable the male member M slidably to be inserted therein to extend substantially throughout the length thereof from the bayonet flange 20, with the concentric portions of the male and female members in interfitting relation for substantially surface to surface contact therebetween. For this purpose, the female member F is formed with an elongate tubular section 30 having a length corresponding generally to the length of the casing 14 of the male member and an internal diameter sufficiently greater than the external diameter of the casing to enable the one to be slidably inserted in telescoping relation with the other. A material of low thermal conductivity (i.e. Teflon) may be used to fill the space between the male and female tubular members 14 and 30. This may be in the form of a coating of desired thickness attached to the tubular male member 14. Its function is to minimize gaseous conduction and convection heat transfer that would normally occur in the space between the tubular members. Its thickness should be such as to fill the space as completely as possible, yet allow enough clearance for assembly. This results in approximately 25% reduction of total heat flow when used.

The rearward end of the female member is provided with an outwardly extending annular bayonet flange 32 having a flat rear face 34 which faces the front face of the bayonet flange 20, with an inner annular groove 36 adapted to receive an annular tongue 39 extending from the front face of the male bayonet flange 20.

A forward end portion 38 of the female member 30, which is adapted to extend beyond the casing 14, when in the assembled relation, is offset inwardly to engage the portion 12 of reduced wall thickness at the forward end of the male member. For this purpose, the end portion 38 is dimensioned to have a length corresponding substantially to the length of the end portion 12 of reduced cross section and an internal diameter corresponding to the external diameter of the portion 12 so as to enable the end portion 12 slidably to be inserted therein in telescoping relation. In the preferred practice of the invention, the end portion 38 is formed of a tubular section of increased wall thickness by comparison with the wall thickness of the section 12 adapted to be received therein.

An important concept of the invention resides in the composition of the metal members forming the interfitting end portions 12 and 38 wherein the end portion 38 is formed of a metal having a higher coefficient of expansion than the metal forming the end portion 12 of the male member. At ambient temperature there is sufficient clearance between the outer wall of the end portion 12 and the inner wall of the end portion 38 to enable the male member easily to be inserted into the female member but, responsive to the reduction in temperature during passage of the cryogenic fluids through the assembled bayonet joint, the female section 38 shrinks onto the male section 12 in a manner to effect a tight, interfitting sealed relation therebetween to provide the primary connection of the cryogenic joint. For example, the tubular section of the male member can be formed of Invar having a coefficient of linear expansion of the order of 0.000001 in./in. degrees C. while the corresponding portion 38 of the female member can be formed of stainless steel having a coefficient of linear expansion of $9.2 \times 10^{-6}$ in./in. degrees C.

The male and female members should be formed of metals which are not embrittled and retain their strength at cryogenic temperatures as low as $-460°$ F. and which are inert to the cryogenic fluids passing therethrough.

The secondary seal which operates to effect a sealing relation between the male and female members until the primary seal takes over comprises an "O" ring 40 positioned in the annular grooves 24 whereby a sealing relation is established between the annular bayonet flanges, when in the assembled relation.

In practice, the entire assembly is enclosed within a casing 50 which extends from the bayonet flanges, in concentric spaced relation, from the outer wall of the tubular members to provide an annular space 52 filled with a super-insulation, such as described in the Matsch U.S. Pat. Nos. 3,007,596; 3,009,600, and 3,009,601, wherein the annular space 52 is evacuated and filled with an insulation system formed of a multiplicity of layers of thin fabric formed of fine fibers of glass, cellulose or other fibrous material characterized by low conductivity, interleaved with reflective barrier sheets having a thickness less than 0.001 and preferably having a thickness within the range of 0.00002 to 0.00003 inch with the barrier sheets formed of a highly reflective heat conductive material, such as a metal film or a metalized plastic film.

While it is preferred to make use of tubular members of rounded shape, it will be understood that the term "tubular members", as used herein, includes cross sections other than round, such as oblong or even a polygonal shape.

In use, the cryogenic connection is effected by first positioning the "O" ring 40, for the secondary seal, within the annular groove 24 in the front face of the flange 20 of the male member. The male member is inserted in telescoping relation through the female member until the bayonet flange 20 of the male member abuts the back face of the bayonet flange 32 of the female member, after which the flange members are clamped together to secure the assembly as by conventional clamping means 54. The "O" ring engages the abutting flanged surfaces to establish a secondary seal therebetween. When inserted to clamping position, the end portion 12 of the male member is concentrically disposed with the end portion 38 of the female member having the higher coefficient of expansion.

In the modification shown in FIG. 4 of the drawings, the radial seal bayonet flange of the male member is in the form of a cylindrical section 50 having a flat peripheral surface 52 formed with an annular groove 54 for receipt of an "O" ring 56. The bayonet flange of the female member is also formed of a cylindrical section 58 having inner diameter slightly greater than the outer diameter of the cylindrical section 50 so as to enable axial sliding engagement between the cylindrical sections 50 and 58 for assembly and disassembly of the bayonet members, allowing longitudinal adjustment. The bayonet sections are held in their adjusted assembled relation by an adjustable nut member 60 well known to the trade.

In use, the "O" ring is first provided in the annular groove 54 and the cylindrical bayonet sections are displaced axially into telescoping relation to provide the desired adjustable length. Thereafter, the bayonet sections are secured in their assembled relation by the adjustable nut locking member 60.

When in use, the cryogenic fluid is caused to flow through the assembly. The decrease in temperature causes the section 38 formed of the metal with the larger coefficient to shrink onto the telescoped section 12 formed of the metal with the lower coefficient. This shrinkage causes an interference fit between the two parts forming a leak-tight seal therebetween. Thus the "O" ring provides a leak-tight face seal on the bayonet flanges until the cryogen is admitted, after which the primary seal caused by the shrink seal takes over.

The shrink seal is surrounded by the vacuum jacket and super-insulation which minimizes convention and radiation heat gain to the cryogen. The shrink seal is separated from the outer wall of the bayonet by a thin tubular spacer which minimizes conduction heat gain.

The described shrink fit design provides a mechanical seal which keeps the cryogen in the bayonet and it provides a a longer conduction path as compared to current conventional bayonets of similar length.

The end of the female member is shown as being joined to the metal 56 of a cryogenic apparatus while the rearward end 58 of the male member can be joined to a conduit for conveying cryogenic fluid. It will be apparent that the members releasably connected by the described bayonet connector may connect one cryogenic device with another or one conduit with another and combinations thereof.

It will also be apparent that as long as cryogen is flowing through the connector, a shrink fit will exist between sections 38 and 12 for joining the elements in sealing relation. When flow of cryogenic fluid is terminated and the parts returned to normal ambient temperature, the grip will be released to enable disengagement of the connector parts, if desired. However, until the bayonet flanges are unclamped, a sealing relation will be maintained by the secondary "O" ring seal.

It will be understood that means other than clamps can be used to secure the flanges in sealing engagement to maintain the secondary seal and that other changes in the details of construction, arrangement and material can be effected without departing from the spirit of the invention, especially as defined in the following claims.

I claim:
1. A cryogenic connector comprising:
   (a) a pair of tubular metal members, one of which is a female member and the other of which is a male member received in concentric relation within the female member;
   (b) means for securing the male and female members in assembled relation, said male and female members each having a portion in sliding engagement in assembled relation when at ambient temperature, with the portion of the female member being characterized by a coefficient of expansion greater than the portion of the male member, the portion of the female member shrinking onto the portion of the male member to provide a mechanical seal therebetween at cryogenic temperatures;

(c) a tubular section secured in spaced concentric relation with the male member substantially throughout its length to define an annular space therebetween and providing guiding contact as the male member is moved into the female member;

(d) a low thermal conductivity material disposed in the space between the outer surface of the tubular section and the inner surface of the female member to minimize heat transfer between said tubular members.

2. A cryogenic connector as claimed in claim 1 in which said spaced tubular section terminates before the portion of the male member adapted to be engaged by the female member in the shrink seal.

3. A cryogenic connector as claimed in claim 1 which includes a casing about the joined male and female members having a space in between filled with super-insulation.

4. A cryogenic connector as claimed in claim 3 in which the space filled with super-insulation is at subatmospheric pressure to insulate the cryogenic connector.

5. A cryogenic connector as claimed in claim 1, in which the means for securing the male and female members in their assembled relation comprises a cylindrical section secured to one of the members and a cylindrical section secured to the other of said members with the cylindrical section of one member adapted axially slidably to receive the cylindrical section of the other member in telescoping relation to enable adjustment of the length of the connection; and means for securing the cylindrical sections in their assembled relation.

6. A cryogenic connector as claimed in claim 5 which includes an annular groove in one of the adjacent faces of one of the cylindrical sections and an "O" ring in the groove.

7. A cryogenic connector comprising:

(a) a pair of tubular metal members, one of which is a female member and the other of which is a male member received in concentric relation within the female member;

(b) means for securing the male and female members in assembled relation, said male and female members each having a portion in sliding engagement in assembled relation when at ambient temperature, with the portion of the female member being characterized by a coefficient of expansion greater than the portion of the male member, the portion of the female member shrinking onto the portion of the male member to provide a mechanical seal therebetween at cryogenic temperatures;

(c) a tubular section secured in spaced concentric relation with the male member substantially throughout its length to define an annular space therebetween and providing guiding contact as the male member is moved into the female member.

* * * * *